Figure 1:
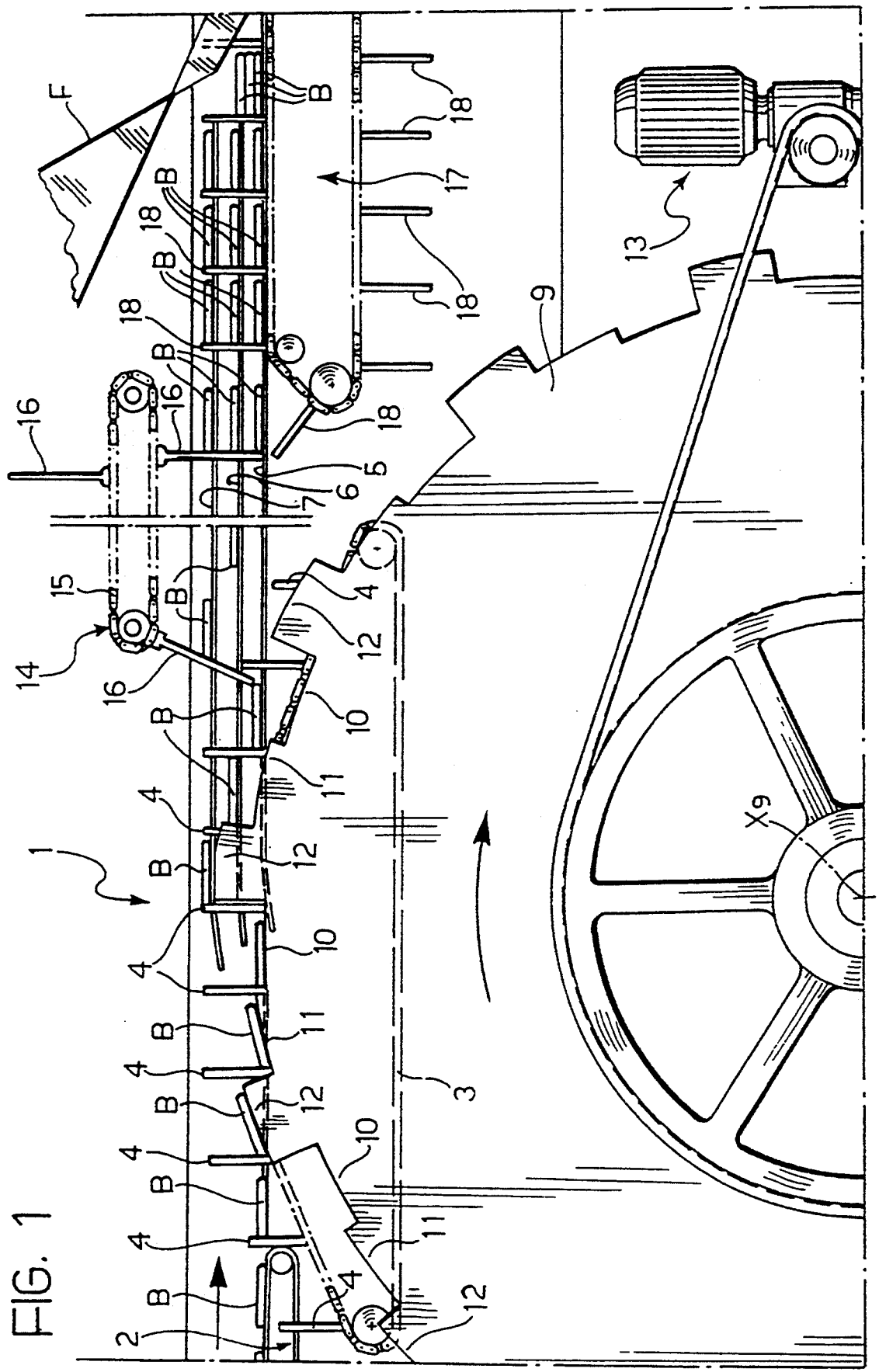

United States Patent [19]

Francioni

[11] Patent Number: 5,341,913

[45] Date of Patent: Aug. 30, 1994

[54] DEVICE FOR FORMING PILES OF ARTICLES, PARTICULARLY FOR AUTOMATIC PACKAGING PLANTS

[75] Inventor: Renzo Francioni, Prato Sesia, Italy

[73] Assignee: Cavanna S.p.A., Prato Sesia, Italy

[21] Appl. No.: 907,527

[22] Filed: Jul. 2, 1992

[30] Foreign Application Priority Data

Jul. 4, 1991 [IT] Italy .......................... TO91A000521

[51] Int. Cl.⁵ ............................................. B65G 57/32
[52] U.S. Cl. ................................... 198/418.4; 198/435
[58] Field of Search ................... 198/418.4, 418.6, 435, 198/441; 414/789.6, 791

[56] References Cited

U.S. PATENT DOCUMENTS

| | | |
|---|---|---|
| 3,098,552 | 7/1963 | Schulz . |
| 3,391,777 | 7/1968 | Joa ...................... 198/418.4 |
| 4,235,329 | 11/1980 | Crawford et al. ............... 198/418.4 |
| 4,413,462 | 11/1983 | Rose ........................ 53/540 |

FOREIGN PATENT DOCUMENTS 1786484  10/1971  Fed. Rep. of Germany .

*Primary Examiner*—Michael S. Huppert
*Assistant Examiner*—Janice Krizek
*Attorney, Agent, or Firm*—Evenson, McKeown, Edwards & Lenahan

[57] ABSTRACT

In a device for forming piles of articles, particularly for articles in an input flow which are diverted onto a certain number of superposed sliding planes. This is achieved by means of one or more wheels, the peripheries of which have segments which are spaced from the axis of rotation of the wheels by distances corresponding to the distances of the sliding planes from the axis of rotation. Each article is thus transferred towards a respective sliding plane by a gradual movement. An alignment conveyor located further downstream vertically aligns groups of articles on the superposed sliding planes to define the piles. The piles are formed as a result of the articles which are on the upper sliding planes falling onto the article below. The piles are preferably formed immediately before they are inserted in their packages.

12 Claims, 3 Drawing Sheets

DEVICE FOR FORMING PILES OF ARTICLES, PARTICULARLY FOR AUTOMATIC PACKAGING PLANTS

DESCRIPTION

The present invention relates to devices for forming piles of articles. The invention has been developed with particular attention to its possible use in automatic packaging plants (automatic packaging or wrapping machines).

In this field of application, and particularly in relation to the automatic packaging of food products such as biscuits or the like, there is often a need to convert a continuous or substantially continuous flow of individual articles into a flow in which the same articles are collected into piles of superposed articles.

To give an example which is, of course, non-limiting, one might consider a plant for the automatic packaging of biscuits such as crackers or the like, in which a continuous or substantially continuous flow of biscuits which advance lying flat is to be converted into an output flow in which the same biscuits are collected into piles each including two or more superposed products.

In the past, various solutions have been proposed for performing this task. For example, it is known to produce devices in which the articles are advanced by a conveyor with a positive action, such as an endless chain with entrainment dogs or nibs, and in which an orientable deflector element is disposed on the entrainment path of the conveyor for lifting the articles transported—in a generally recurring sequence—towards two or more superposed sliding planes; articles which are sliding on planes at different heights are then stacked so as to form the piles (for example, as a result of the subsequent lowering of a certain number of the dogs of the entrainment chain, also in a recurring sequence).

A solution of this type is satisfactory as long as the rate of the input flow of articles is limited (for example, 150–170 items per minute); it certainly cannot be proposed, however, for faster operating rates (for example, 600 items per minute or more) since, in this case, the speed of orientation to be imparted to the deflector element, which shunts the articles onto the different planes in sequence, would become so fast as to cause the articles transported actually to be thrown upwards. This would eliminate any possibility of the flow of articles being controlled safely.

The object of the present invention is to provide a device which can form piles of transported articles in a safe and reliable manner, even with fast operating rates of the order of 600 articles per minute or more.

According to the present invention, this object is achieved by virtue of a device having the specific characteristics recited in the following claims.

Figure 2:
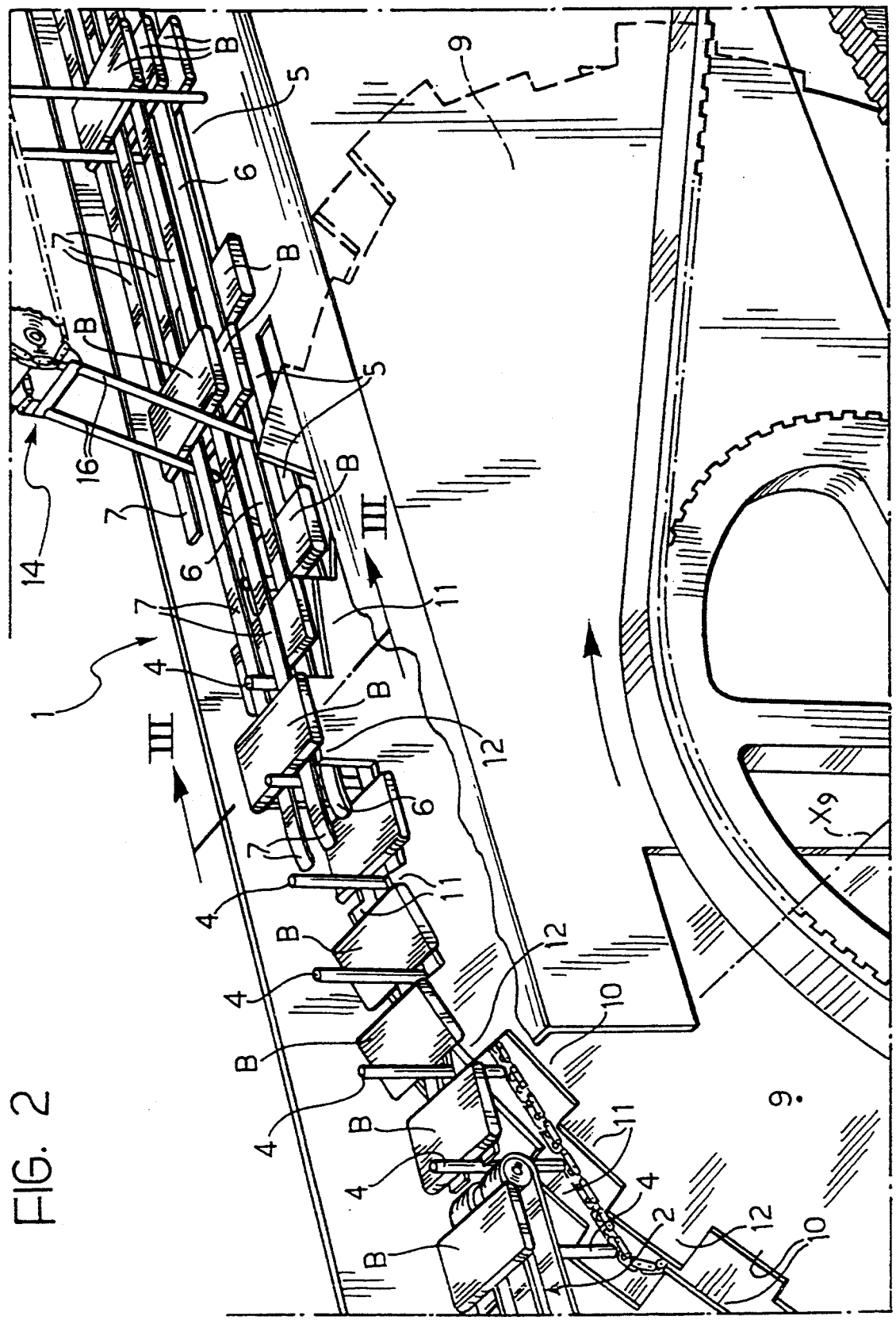
Figure 3:
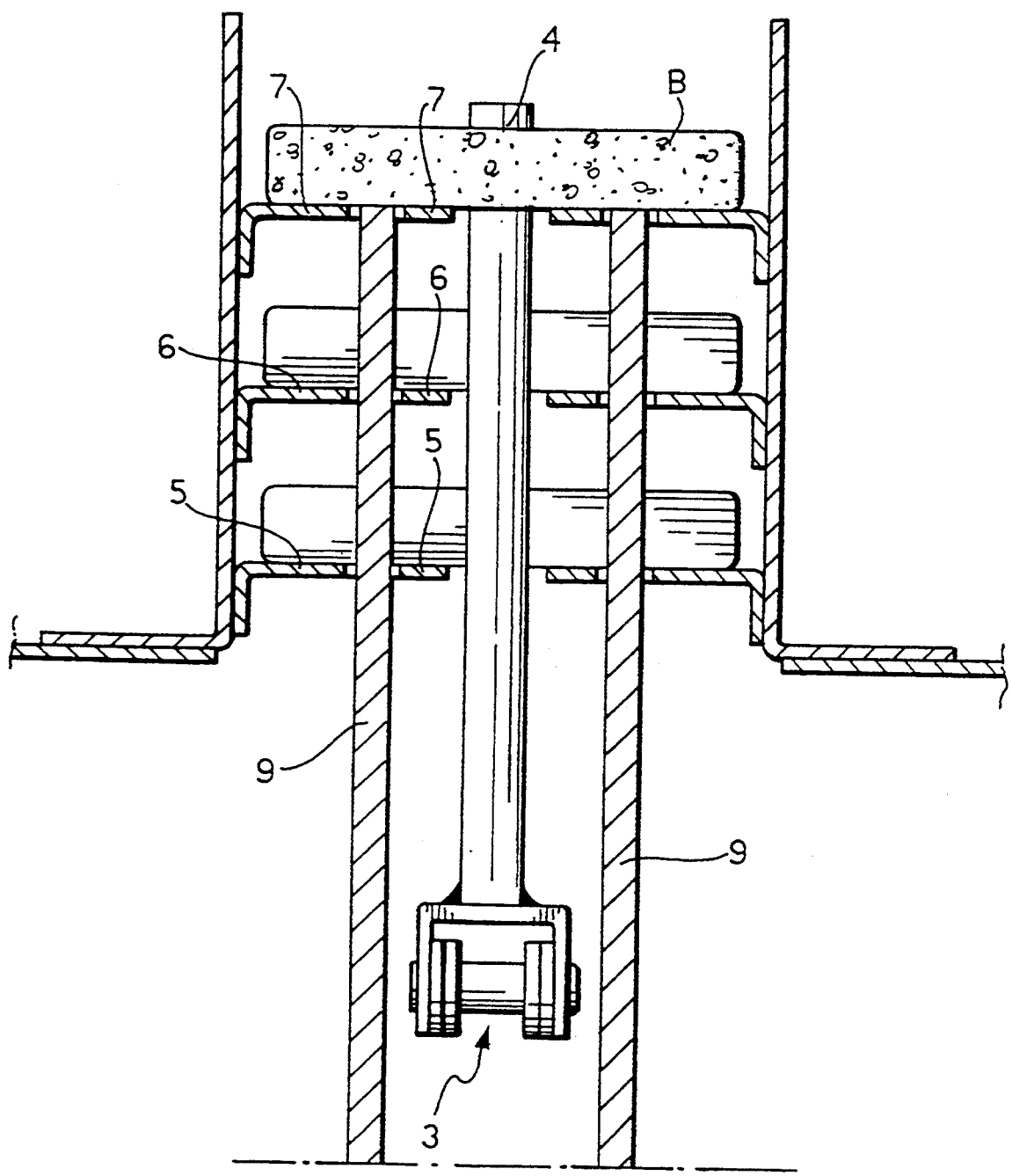

The invention will now be described, purely by way of non-limiting example, with reference to the appended drawings, in which:

FIG. 1 is a schematic, elevational view of a portion of an automatic packaging plant including a device according to the invention, FIG. 2 is a perspective view of the same portion of the plant, and FIG. 3 is a section taken on the line III—III of FIG. 2.

In FIGS. 1 and 2, a portion of a plant, not shown as a whole, for the automatic packaging of articles, is generally indicated 1.

For example, the plant may be for the automatic packaging of food products such as biscuits (for example, crackers) B which are supplied (from the left with reference to the situation of FIGS. 1 and 2) in a continuous flow at a rate of the order of hundreds of items per minute.

The products B, which advance lying flat on a conveyor 2 constituted by two endless motor-driven belts (of widely known type), may come, for example, from a forming station, such as an oven or the like.

The biscuits B, which initially advance in a flow of individual articles, are to be transferred to a processing station located downstream, for example, a wrapping machine of the type currently known as a "flow-pack", "form-fill-seal", or simply "FFS" machine; the path along which the sheet F for forming the wrappers is supplied to the machine is shown schematically (on the right-hand side of FIG. 1 alone). In particular, the biscuits B are not to be supplied to the wrapping machine individually but are to be arranged in piles each including, for example, three superposed biscuits B.

Naturally, the solution according to the invention is suitable for forming piles including any number of products.

The biscuits B are taken over from the belt conveyor 2 by another conveyor 3 constituted by a motor-driven chain conveyor (of widely known type) with entrainment nibs or dogs 4 which are generally "tall" or "long" in the sense that the length of each, measured in a direction perpendicular to the plane of advance of the active pass of the conveyor 3, is much greater than the depth (measured in the same direction and hence the thickness) of each biscuit B.

In particular, (for reasons which will become clearer from the following) the length of each dog 4 must be at least a little greater than the distance between the lowest and the highest of a set of horizontal superposed sliding planes 5, 6 and 7 (three planes, in the non-limiting example described herein) on which the biscuits B are to be made to slide according to criteria better described below.

Because of their height, the dogs 4 are not mounted on the links of the chain of the conveyor 3 in fixed positions. On the contrary, orientation means (of known type) are associated therewith for ensuring that in the upstream portion of the conveyor 3, in which this latter conveyor is inserted between the belts of the upstream conveyor 2 from below (see FIG. 2 in particular), the dogs 4 do not extend generally perpendicular to the pass of the chain on which they are mounted but retain an approximately vertical orientation. This prevents the travel of the dogs 4 during their insertion between the belts of the conveyor 2 from being too long and thus necessitating a corresponding increase in the spaces between successive biscuits B, which would adversely affect the density of the input flow of articles.

The fact that the dogs 4 are articulated on the chain 3 also enables them to disappear in a similarly gradual manner and in vertical orientations at the output or downstream end of the chain 3.

The three sliding planes 5, 6 and 7 generally extend for a certain distance into the region in which the conveyor 3 transports the products. In general (and also for reasons which will become clearer from the following) the upstream or input end (with reference to the direction of advance of the biscuits B) of the upper sliding plane 7 projects a certain distance beyond the upstream end of the immediately underlying sliding plane 6 which in turn projects a certain distance beyond the corresponding end of the lower sliding plane 5.

It will also be appreciated that the upstream ends, at least of the upper sliding planes 6 and 7, curve slightly downwards.

This is in order to achieve a better connection with a unit for lifting the biscuits B, which is constituted essentially by two coupled wheels 9 arranged side by side and rotatable about a corresponding horizontal axis $X_9$ which is a certain distance (typically 60–70 cm) below the surface of the conveyor 3 on which the biscuits B slide.

The periphery of each wheel 9 is divided into a plurality of successive arcs 10, 11 and 12 (which may be approximated by straight or generally rounded segments which do not necessarily constitute arcs of a circle) located at different radial distances from the axis of rotation $X_9$ in cyclically recurring sequences.

In the specific embodiment illustrated, the peripheries of the wheels 9 have cyclic sequences of three arcs or segments constituted by:

a first segment 10 spaced from the axis $X_9$ by a radial distance equal to the distance between that axis and the lower sliding plane 5 (or, more precisely, the geometrical plane in which that sliding plane extends), a second segment 11 spaced from the axis $X_9$ by a radial distance equal to the distance between that axis and the geometrical plane in which the second sliding plane 6 extends, and a third segment 12 spaced from the axis $X_9$ by a radial distance equal to the distance between that axis and the geometrical plane in which the third sliding plane 7 extends.

In other words, as the wheels rotate (in a clockwise sense with reference to the arrangement of FIG. 2) an imaginary observer positioned on the periphery of each wheel 9 will see passing in sequence a "low" segment 10, an "intermediate" segment 11, a "tall" segment 12, another "low" segment, another "intermediate" segment 11, and so on.

Naturally, the provision of a sequence of three segments at different radial distances corresponds to the presence of three sliding planes 5, 6 and 7 and, consequently, to the desire to form piles including three superposed biscuits B. If piles including two superposed biscuits are to be formed, wheels 9 including peripheral segments located at two different radial distances from their axis of rotation $X_9$ will be used. Similarly, if piles of four biscuits B are to be formed, wheels 9 including sequences of four segments located at four different radial distances from their axis of rotation $X_9$ will be used.

The speed at which the wheels 9 rotate is controlled by respective drive means 13 so as to be synchronised (as regards both the speed and the phase of rotation) with the advance of the conveyor 3 (and, in particular, with the advance of the dogs 4 thereof) so that, as each biscuit B advancing on the conveyor 3 reaches the region in which the wheels 9 operate (the wheels being on opposite sides of the conveyor chain 4, as can better be seen in the perspective view of FIG. 2 and in the section of FIG. 3) two segments of equal height of the two wheels 9 will appear from below the conveyor surface defined by the chain 3 on opposite sides of the chain 3 and will take up the biscuit at a speed and phase exactly corresponding to the movement of advance determined positively by the dogs 4, and will divert it towards one of the planes 5, 6 and 7.

The biscuits B which advance in synchronism with two "low" segments 10 will thus simply be accompanied by the wheels 9 onto the lower sliding plane 5.

The biscuits B advancing in synchronism with two "intermediate" segments 11 of the wheel, however, will be lifted gradually thereby so as to be sent to the central sliding plane 6.

Finally, those biscuits B which advance in synchronism with two "tall" segments 12 of the wheels 9 will gradually be lifted by those segments so as to be sent towards the upper sliding plane 12.

This takes place in a generally recurring sequence (as a result of the recurring sequential distribution of the segments 10, 11 and 12 around the peripheries of the wheels 9) so that the input flow of articles B is divided into three superposed flows which advance on the planes 5, 6 and 7. For the moment, the flows will be offset in the direction of advance since each biscuit B will still be entrained by the respective dog 4, the height of which, as has been seen, is such that it extends above the upper sliding plane 7 so as to entrain the biscuits diverted onto that plane.

In this connection, it will be appreciated (see also the sectional view of FIG. 3) that each of the three planes 5, 6 and 7 is actually constituted by two horizontal plates or strips extending side by side on opposite sides of the dogs 4 so that a gap is left between them along which the dogs 4 are free to slide. Moreover, in the region in which the wheels 9 operate, the strips in question have notches which enable the wheels 9 to rotate freely without interfering with the strips in question but which ensure the precise and controlled sliding of the biscuits B which are being handled.

The biscuits B continue to move in the three superposed and offset flows as far as the downstream end of the conveyor 3. In this region, the three flows in question are taken over by a further conveyor 14 which is preferably disposed above the sliding planes 5, 6 and 7 and is also constituted by an endless, motor-driven structure (typically a chain 15) with entrainment formations 16 with generally fork-like configurations each having two prongs separated by a space slightly wider than the dogs 4 of the conveyor 3.

The chain 15 can thus be driven (anticlockwise with reference to the situation shown in FIGS. 1 and 2) so that the fork-shaped formations 16 are inserted from above to interpenetrate at least marginally and transitorily with the dogs 4 which descend as a result of the passage of the chain of the conveyor 3 around the return element (roller or wheel) which operates at the output end.

Whilst, for obvious reasons, the spaces between the dogs 4 of the conveyor 3 correspond to the lengths of the individual articles, that is, of the biscuits B, the spaces between the forks 16 of the conveyor 14 are selected so as to correspond to (actually, to be slightly greater than) the overall length of the biscuits of each pile and hence, in the embodiment referred to, to the overall length of three biscuits B.

It will also be appreciated that the forks 16 are mounted on the chain 15 so that they are not fixed but can be oriented (by known mechanisms) and are therefore inserted from above not by a generally radial movement, but by a generally downward movement.

The fact that the forks 16 are articulated also means that, when they move away upwardly at the output end of the conveyor 14, their movement has no appreciable radial component.

The operating speed and phase of the conveyor 14 are regulated in relation to the operating speed and phase of the conveyor 3 (also according to known criteria which do not need to be described specifically herein) so that each fork 16 is inserted between the sliding planes 5, 6 and 7 immediately behind each biscuit B advancing on the upper sliding plane 7.

The length or height of each fork 16 is selected, in relation to the distance between the planes 5, 6 and 7 and to the position in which the chain 15 is mounted, so that the free ends of the forks 16 can engage and entrain the biscuits B which are on the lowest sliding plane 5. As a result of the gradual advance of the fork 16 between the planes 5, 6 and 7, the biscuits B on the superposed sliding planes (5, 6 and 7) are thus gradually aligned so that the biscuits to be included in each pile are effectively superposed. It will be appreciated, however, that, whilst the biscuits in question are already superposed, they are not yet in contact with each other since each is advancing on a respective sliding plane 5, 6 or 7.

At the output end of the conveyor 14, a further conveyor 17 (also constituted by a chain conveyor) with dogs 18 which are similar to the dogs 4 of the conveyor 3 and are also articulated to their chain in a similar manner is inserted between the sliding planes 5, 6 and 7 generally from below. Each of the dogs 18 can thus act simultaneously on all three biscuits B which are superposed on the three sliding planes 5, 6 and 7.

Compared with the forks 16 of the conveyor 14, the dogs 18 are spaced by distances which, in practice, correspond to the horizontal length of each pile and thus, in practice, to the horizontal length of each biscuit B.

The conveyor 17 is intended to advance the piles of biscuits B towards the wrapping machine which is located downstream. Preferably, as shown schematically in FIG. 1, the biscuits B of each pile are kept separate by being advanced on the superposed planes 5, 6 and 7 until they reach the station in which the wrapper of sheet material F is formed by the wrapping machine. At this point, the sliding planes 5, 6 and 7 terminate (generally in slightly different positions for the two strips constituting each plane) so that the biscuits B in higher positions in the pile (that is, in practice, the biscuits sliding on the plane 6 and the plane 7) fall onto the biscuit B which is in the lower position. Preferably, the fact that, in practice, the biscuits in the upper positions fall to form the actual pile within the station in which the tubular wrapper is formed minimises the adverse effects which could result from any disturbance of the exact vertical alignment of the products in each pile as a result of the biscuits B which are in the higher positions falling onto the underlying biscuit B.

Naturally, the principle of the invention remaining the same, the details of construction and forms of embodiment may be varied widely with respect to those described and illustrated, without thereby departing from the scope of the present invention. For example, instead of being constituted by a chain with dogs which are inserted between the wheels 9, the conveyor 3 could include two conveyor formations arranged side by side outwardly of the wheels 9.

What is claimed is:

1. A device for forming, from an input flow of articles, an output flow of piles of articles in which each pile includes a predetermined number of superposed articles, the device including:
   a number of superposed sliding planes at least equal to the predetermined number, and
   means for diverting the input flow of articles in order to divide the input flow of articles into respective output flows of articles, each on a respective superposed sliding plane, wherein the diverting means include at least one wheel formation rotatable about an axis of rotation, the periphery of which formation has segments which are arranged in a cyclic sequence at different radial distances from the axis of rotation of the wheel formation, the number of segments in each sequence being equal to the predetermined number and the distance of each segment of the sequence from the axis of rotation of the wheel formation being substantially equal to the distance between that axis of rotation and the plane in which the respective output sliding plane is located, and
   entrainment means for supplying the input flow of articles to the periphery of the at least one wheel formation so that each article cooperates with a respective segment in order to be transferred to a respective output sliding plane, said entrainment means including a conveyor with entrainment formations articulated thereto to maintain a desired planar orientation of the entrainment formations between successive pairs of which each of the articles is entrained.

2. A device according to claim 1, wherein the device includes two wheel formations arranged side by side with the entrainment means interposed between the two wheel formations.

3. A device according to claim 1 wherein the lengths of the entrainment formations are at least slightly greater than the distance between the highest and the lowest of the superposed sliding planes.

4. A device according to claim 1, wherein the device includes a first conveyor to which the input flow of articles is supplied, the first conveyor transferring the articles to the entrainment means, the entrainment means cooperating with the at least one wheel formation.

5. A device according to claim 4, wherein the first conveyor includes two conveyor formations side by side and the positive entrainment formations of the second conveyor are inserted between the side-by-side entrainment formations of the first conveyor.

6. A device according to claim 1, wherein at least some of the superposed sliding planes extend into the region in which the at least one wheel formation operates.

7. A device according to claim 6, wherein at least those superposed conveyor planes which are in upper positions have downwardly-curved upstream ends.

8. A device according to claim 1, further including alignment conveyor means which are generally downstream of the region in which the at least one wheel formation operates and which have entrainment formations which can be inserted between the superposed sliding planes to accumulate the articles on the superposed sliding planes in a direction such as to superpose them and thus to form the pile.

9. A device according to claim 8, wherein the entrainment formations of the alignment conveyor means are generally fork-shaped so as to be able to cooperate, at least locally, with the entrainment means.

10. A device according to claim 9, wherein the alignment conveyor means generally act from above the articles.

11. A device according to claim 10, wherein the device has further conveyor means downstream of the alignment conveyor means, the further conveyor means having respective formations for positively entraining the articles on the sliding planes, the space between the respective formations of the further conveyor means corresponding substantially to the length of each individual article in the pile.

12. A device according to claim 1, wherein for supplying a flow of piles of articles to a packaging machine the superposed sliding planes extend substantially as far as the packaging machine.

* * * * *